Oct. 29, 1929.　　P. CAPITO ET AL　　1,733,115
RECIPROCABLE CRADLE STRUCTURE
Filed April 19, 1928　　2 Sheets-Sheet 1

INVENTORS
Pete Capito
BY Vincenzo De Franco
N. E. Dunlap
ATTORNEY

Oct. 29, 1929. P. CAPITO ET AL 1,733,115
RECIPROCABLE CRADLE STRUCTURE
Filed April 19, 1928 2 Sheets-Sheet 2

INVENTORS
Pete Capito
Vincenzo De Franco
BY
N.E. Dunlap
ATTORNEY

Patented Oct. 29, 1929

1,733,115

UNITED STATES PATENT OFFICE

PETE CAPITO AND VINCENZO DEFRANCO, OF WEIRTON, WEST VIRGINIA

RECIPROCABLE CRADLE STRUCTURE

Application filed April 19, 1928. Serial No. 271,255.

This invention relates broadly to cradles for infants, and more specifically to a shiftable crib structure.

The primary object of the invention is to provide a bed or crib structure for infants which is horizontally reciprocable and which embodies electrically driven means whereby reciprocating movements are imparted thereto.

In describing the invention in detail, reference is herein had to the accompanying drawings, in which—

Figure 1:
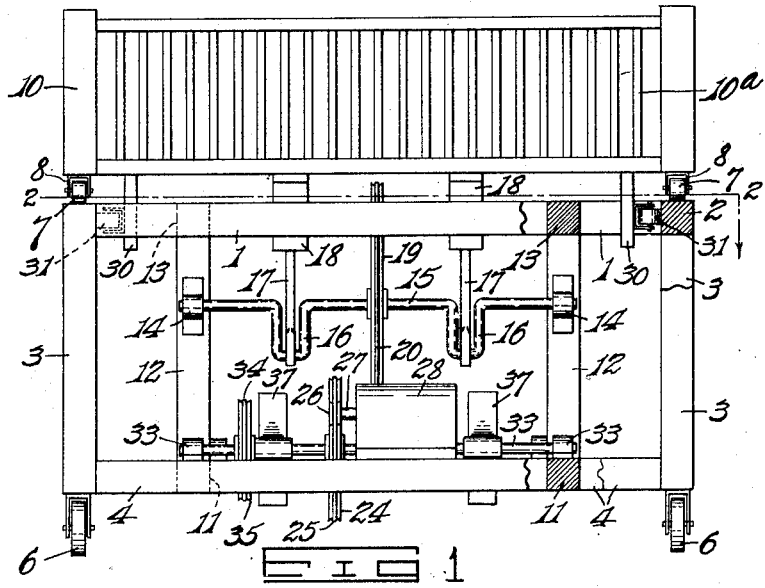
Figure 1 is a view partly in side elevation and partly in section, illustrating the invention.
Figure 2:
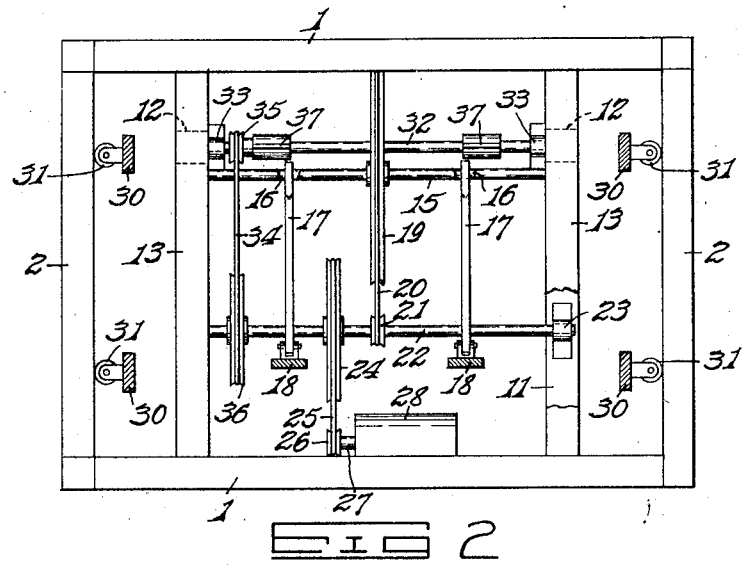
Figure 2 is a section on line 2—2, Fig. 1.
Figure 3:
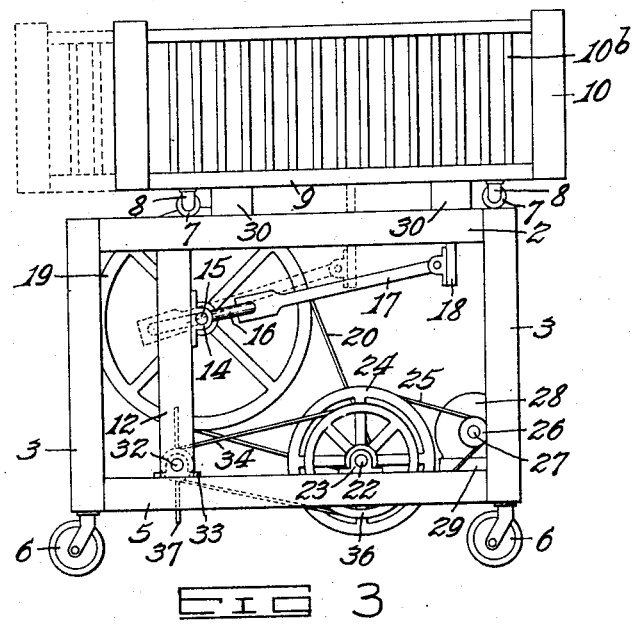
Figure 3 is an end elevation.
Figure 4:
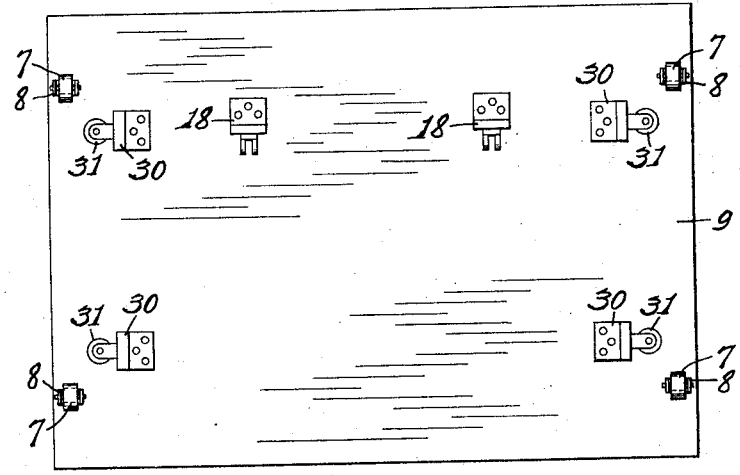
Figure 4 is an under side elevation of the carriage, detached.

Referring to said drawings, 1 designates the sides and 2 the ends of the top of a rectangular frame which is carried upon the upper ends of upright supports 3. Said supports, which are suitably braced adjacent to their lower ends, as by horizontal connecting side and end members 4 and 5, are preferably mounted upon wheels or casters 6 for rendering the same readily shiftable.

Mounted for travel upon the top of the frame, as upon the ends 2 of the latter, are rollers 7 carried by brackets 8 which are rigidly attached to the under side of the bottom 9 of a carriage 10 which may have the form of a child's bed or crib, as shown, having slatted sides 10ª and ends 10ᵇ. Said frame members 2 constitute trackways upon which said rollers 7 are adapted to travel back and forth to effect horizontal reciprocations of the carriage, such reciprocations being designed to replace the rocking movements of the usual form of cradle.

Carried by each of two transversely disposed frame members 11 located intermediate the end members 5 are the lower ends of upright supports 12 which have their upper ends attached in underlying relation to cross members 13 carried by the sides 1 of the frame. Fixed on one face of each of said upright supports 12 at a suitable elevation is a bearing 14, and journaled in said bearings are the opposite ends of a shaft 15 which is shaped intermediate its ends to form cranks 16. Each of said cranks has attached thereto an end of a connecting rod 17 which has its opposite end pivotally attached to a bracket 18 fixed upon the bottom 9 of the carriage.

A pulley or belt wheel 19 fixed on the crank shaft 15 is connected by a drive belt 20 to a relatively small belt wheel 21 fixed on a counter-shaft 22 which is jouranled in bearings 23 carried by the cross members 11. Said countershaft also carries a larger belt wheel 24 connected by a drive belt 25 to a small belt wheel 26 mounted on the rotor shaft 27 of an electric motor 28 which is located in an appropriate position, as upon a supporting bracket or base 29 fixed upon the lower part of the frame.

From the foregoing description, it will readily be understood that power is communicated from the motor 28 to the carriage 10 for imparting to the latter reciprocating movements in which its supporting rollers 7 travel back and forth upon the top surfaces of the ends 2 of the frame.

To guard against possible endwise shifting of the carriage, the latter has mounted upon the under side of its bottom 9 adjacent to each of its opposite ends a pair of relatively spaced brackets 30, each carrying a roller 31 in a position wherein its periphery rides against the inner side wall of the adjacent end member 5 of the top frame.

As herein shown, a shaft 32 is journaled in bearings 33 carried by the frame members 11 and is driven at high speed by a belt 34 connecting a thereby-carried belt wheel 35 to a belt wheel 36 mounted on the countershaft 22. One or more wheels embodying fan blades 37 are mounted on said shaft and function to create a rapid circulation of air, thereby to effect a lowering of the temperature within the lower part of the structure.

In this connection, it will be understood that the sides and ends of the frame may be suitably enclosed, thereby to conceal the driving mechanism. Since the enclosing means forms no part of the present invention, showing thereof in the drawings is omitted.

As is manifest, various changes in the form and arrangement of some of the parts of the structure may be resorted to without departing from the spirit or scope of the invention as defined in the appended claim.

What is claimed is—

In combination with a frame having an open top, a pair of spaced longitudinal horizontal members carried by the frame at the bottom thereof, a pair of uprights secured at their lower ends to said members, a movable carriage on the frame, a pair of spaced brackets depending from the carriage within said frame, a crank shaft journaled on said uprights, connecting rods between the cranks and the brackets located below the top of the frame, a countershaft, a motor for driving the countershaft, and means operable by the countershaft for driving the crank shaft.

In testimony whereof we affix our signatures.

PETE CAPITO.
VINCENZO DEFRANCO.